A. DEWINSKY.
HAMMER.
APPLICATION FILED MAY 25, 1914.

1,166,041.

Patented Dec. 28, 1915.

Witnesses
Robert M. Sutphen
A. J. Hind

Inventor
AARON DEWINSKY

By Watson E. Coleman
Attorney

UNITED STATES PATENT OFFICE.

AARON DEWINSKY, OF BETHLEHEM, PENNSYLVANIA.

HAMMER.

1,166,041.

Specification of Letters Patent. Patented Dec. 28, 1915.

Application filed May 25, 1914. Serial No. 340,881.

*To all whom it may concern:*

Be it known that I, AARON DEWINSKY, a naturalized citizen of the United States, residing at Bethlehem, in the county of Lehigh and State of Pennsylvania, have invented certain new and useful Improvements in Hammers, of which the following is a specification, reference being had to the accompanying drawings.

This invention relates to improvements in shoemakers' hammers or similar tools, and relates particularly to improved means for detachably connecting the handle to the body of the hammer.

An object of this invention is the provision of a tool body, and one in which a recess is formed to receive a reduced neck of the handle of the tool, a cover plate being provided for engagement against the recessed side of the body to close the recess therein and detachably connect the handle to the head.

Another object of this invention is the provision of improved means for attaching the handle of the tool to the body thereof, the body being provided in one side with a recess, the base wall of which is curved and the side walls of which converge toward the open side of the body, the handle of the tool being provided with a reduced neck which is oval-shaped in cross-section so that when the neck of the handle is engaged in the recess in the body, the sides of the neck are disposed behind the outer ends of the converged side walls of the recess, whereby the handle can only be removed by rotating the handle to dispose the smallest dimension of the neck in alinement with the open end of the recess.

Figure 1:
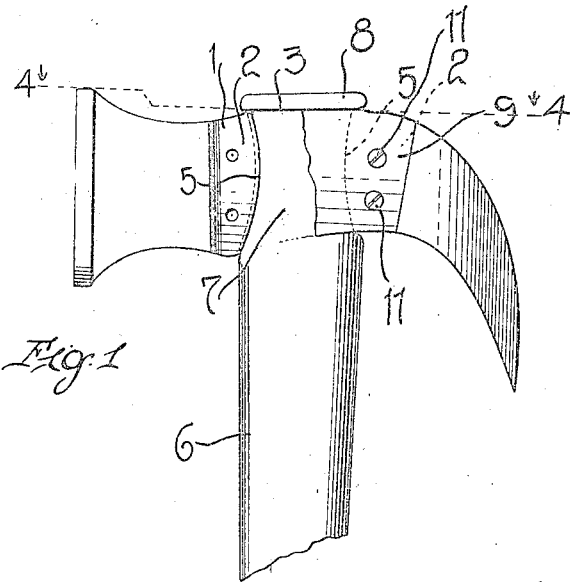
Figure 3:
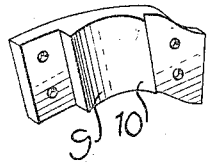
Figure 2:
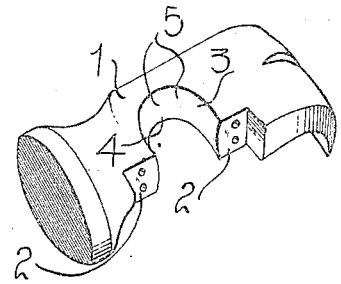
Figure 4:
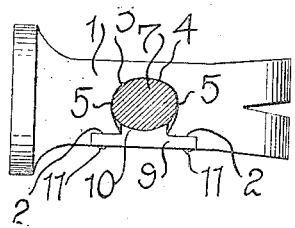

With the above and other objects in view, my invention consists in the novel construction, combination, and arrangement of parts to be hereinafter more fully described, claimed, and illustrated in the accompanying drawing, in which, Figure 1 is a side elevational view of my improved hammer with the cover plate partly broken away; Fig. 2 is a perspective view of the body of the hammer with the cover plate removed; Fig. 3 is a perspective view of the cover plate; and Fig. 4 is a sectional view on the line 4—4 of Fig. 1.

Referring more particularly to the drawing, the numeral 1 designates the body of the hammer which is provided in one side thereof with a countersunk portion 2, and a recess 3, the open side of which communicates with the countersunk portion of the body. The base wall of the recess is curved as at 4, and the side walls thereof are converged as at 5, toward the open end of the recess so that the distance between the side walls at their extremities is less than the width of the base wall of the recess. The handle 6 of the hammer is provided, adjacent its outer end, with a reduced neck 7, the handle being provided on its outer extremity with a head 8 which is of relatively greater dimension than the neck 7. The reduced neck of the handle is substantially oval-shaped in cross-section, and the greatest dimension thereof is of relatively greater width than the distance between the extremities of the side walls 5 of the recess, and to connect the handle to the body of the hammer, the reduced neck must be disposed so that the narrowest dimension thereof is engaged in the recess, whereupon the handle is rotated to dispose the widest or greatest dimension of the neck across the recess so that the extremities of the side walls 5 engage over the sides of the neck to provide a tight joint between the body of the hammer and the handle. It will be seen that the enlarged head 8 on the extremity of the handle engages one face of the body of the hammer and the body portion of the handle engages against the opposite face of the body of the hammer so that longitudinal movement of the body with relation to the handle is prevented. To prevent rotation of the handle with relation to the body of the tool, a cover plate 9 is disposed within the countersunk portion 2 of the body 1, the cover plate being provided with an inwardly extending curved enlargement 10 to engage against the neck of the hammer at the open side of the recess, and the cover plate 9 is secured to the body by suitable screws or other similar fastening devices 11.

From the above description, taken in connection with the accompanying drawing, it will be seen that I have provided improved means for attaching the handle to the body of the hammer, the peculiar form of the reduced neck of the handle and the recess in the body of the hammer, providing a tight joint between the hammer and body, and the cover plate 9 preventing rotation of the handle with relation to the body so that accidental disengagement of the hammer from the tool is prevented.

While I have shown the attaching means as used in connection with a hammer, in the accompanying drawing, it will be readily understood that other tools, such as axes or the like, may be readily provided with my improved attaching means and that all danger of slipping of a tool from a handle constructed in accordance with my invention, is obviated.

Having thus fully described my invention, what I desire to claim and secure by Letters Patent, is:—

1. A tool comprising a body and a handle, said body having an eye recess formed in one side thereof, the side wall of which is convexly curved in the direction of the axis of the eye, the wall of said recess also converging toward the side opening thereof whereby to form a relatively contracted throat, the handle being provided with a neck, the neck being longitudinally concavely curved to accord with the convex curvature of the recess wall, the diameter of the neck at its greatest dimension being greater than the width of the throat of the recess, whereby the narrowest dimension of the neck must be introduced through the open side of the body and the handle turned to dispose the neck entirely within the recess, and a cover plate detachably connected to the open side of the body for engagement against the neck of the handle, whereby to prevent the handle from turning within the recess.

2. A tool comprising a body and a handle, the body having a countersink in one side face and an eye recess extending inward from the countersink, the side wall of the eye recess being narrower at its middle than at its ends, and said side wall converging toward the opening in the countersink to thereby form a relatively contracted throat, the handle being formed with a neck, the middle of the neck being less in diameter than either end of the neck, said neck being elliptical in cross section and its greatest dimension being greater than the width of said throat, whereby the narrower dimension of the neck must be introduced through the throat of the recess and the handle turned to dispose the neck entirely within the recess, a cover plate adapted to fit said countersink and having a thickened middle portion adapted to extend into said throat, the inner face of the thickened middle portion being concavely curved, and means holding the handle detachably in engagement with the body.

3. A tool head having an eye of substantially elliptical form in plan, the wall of the eye being convexly curved longitudinally, the eye opening upon the face of the head, said opening being narrower than the major axis of the eye, whereby to form a relatively contracted throat, and a cover plate detachably held against the side face of the head and having a thickened middle portion insertible into said throat.

In testimony whereof I hereunto affix my signature in the presence of two witnesses.

AARON DEWINSKY.

Witnesses:
JOHN D. WOLLE.
F. J. HAUS.